US008911855B2

(12) United States Patent
Kawashima et al.

(10) Patent No.: US 8,911,855 B2
(45) Date of Patent: Dec. 16, 2014

(54) METHOD FOR MANUFACTURING IMPREGNATION-COATING TYPE JAPANESE PAPER MASKING TAPE BASE MATERIAL

(75) Inventors: Noriaki Kawashima, Fuji (JP); Kazumasa Nara, Fuji (JP)

(73) Assignee: KJ Specialty Paper Co., Ltd., Fuji-Shi (JP)

( * ) Notice: Subject to any disclaimer, the term of this patent is extended or adjusted under 35 U.S.C. 154(b) by 0 days.

(21) Appl. No.: 13/990,666

(22) PCT Filed: Jan. 16, 2012

(86) PCT No.: PCT/JP2012/050718

§ 371 (c)(1), (2), (4) Date: May 30, 2013

(87) PCT Pub. No.: WO2012/099058

PCT Pub. Date: Jul. 26, 2012

(65) Prior Publication Data

US 2013/0260116 A1 Oct. 3, 2013

(30) Foreign Application Priority Data

Jan. 17, 2011 (JP) ................................ 2011-006829

(51) Int. Cl.

| | |
|---|---|
| ***B32B 5/28*** | (2006.01) |
| ***D21H 27/00*** | (2006.01) |
| ***D21H 11/20*** | (2006.01) |
| ***D21H 21/14*** | (2006.01) |
| ***C09J 7/04*** | (2006.01) |

(52) U.S. Cl.

CPC ................ *C09J 7/04* (2013.01); *C09J 2203/31* (2013.01); *D21H 27/00* (2013.01); *D21H 11/20* (2013.01); *D21H 21/14* (2013.01); *C09J 2400/283* (2013.01)

USPC ........................................................ 428/212

(58) Field of Classification Search

USPC .......................................... 264/126; 442/381

See application file for complete search history.

(56) References Cited

U.S. PATENT DOCUMENTS

| | | | | |
|---|---|---|---|---|
| 5,496,626 | A * | 3/1996 | Hamajima et al. | ............ 442/412 |
| 2010/0080988 | A1* | 4/2010 | Hayakawa et al. | ........... 428/343 |

FOREIGN PATENT DOCUMENTS

| | | | |
|---|---|---|---|
| JP | 06-200462 | A | 7/1994 |
| JP | 11-080686 | A | 3/1999 |
| JP | 3691622 | B | 6/2005 |
| JP | 2006-207068 | A | 8/2006 |
| JP | 2007-031552 | A | 2/2007 |
| JP | 2009-235609 | A | 10/2009 |
| JP | 4456662 | B | 2/2010 |
| JP | 2010-203006 | A | 9/2010 |
| JP | 4808987 | B | 8/2011 |

OTHER PUBLICATIONS

Minayoshi et al, JP 2009235609 Translation.*
Oya et al, JP 10231462 Translation.*
International Preliminary Examination Report completed Aug. 15, 2012 for the corresponding PCT Application No. PCT/JP2012/050718.
International Search Report mailed Apr. 17, 2012 for the corresponding PCT Application No. PCT/JP2012/050718.
Office Action mailed Sep. 24, 2014 for the corresponding Chinese Application No. 201280005644.9.

* cited by examiner

*Primary Examiner* — Aaron Austin
*Assistant Examiner* — Jasper Saberi
(74) *Attorney, Agent, or Firm* — Leason Ellis LLP.

(57) ABSTRACT

The present invention relates to a masking tape base material using a machine-made Japanese paper as a base paper. The machine-made Japanese paper comprises a mercerized softwood pulp and a kraft pulp. The weight percent of the mercerized softwood pulp in a mixture of the mercerized softwood pulp and the kraft pulp is from 10 to 70% by weight. The machine-made Japanese paper is impregnated with a resin having a glass transition temperature of not higher than −25° C. in an amount of 20% by weight or more. One surface of the impregnated machine-made Japanese paper is further coated with a resin having a glass transition temperature (Tg) of from 0 to 40° C. in a dry coating amount of from 2 to 20 g/m$^2$.

2 Claims, No Drawings

METHOD FOR MANUFACTURING IMPREGNATION-COATING TYPE JAPANESE PAPER MASKING TAPE BASE MATERIAL

CROSS-REFERENCE TO RELATED PATENT APPLICATIONS

This application is a U.S. National Phase Application under 35 U.S.C. §371 of International Patent Application No. PCT/JP2012/050718, filed Jan. 16, 2012, and claims the benefit of Japanese Patent Application No. 2011-006829, filed Jan. 17, 2011, all of which are incorporated by reference herein in their entirety. The International Application was published in Japanese on Jul. 26, 2012 as International Publication No. WO/2012/099058 under PCT Article 21(2).

FIELD OF THE INVENTION

The present invention relates to a Japanese paper tape base material that is a support of an adhesive tape which is used for masking. The present invention relates to an impregnation-coating type Japanese paper masking tape base material having excellent workability, which is easily stretchable, has good conformability, and hardly causes tape tearing because of its sufficient tear strength.

BACKGROUND OF THE INVENTION

Paper adhesive tapes are widely used for masking at the time of every painting on vehicles, buildings, and the like. The paper adhesive tapes are required to have sufficient strength such that they are not easily torn at the time of peeling. As a support of such a paper adhesive tape, there are known ones having a configuration in which a synthetic resin is coated as an undercoat layer of an adhesive layer on one surface of a base paper in which a wood pulp is mixed with synthetic fibers, and a synthetic resin is coated as a sealing layer of a release agent and a paint permeation-preventing layer on the opposite surface (such a support will be hereinafter referred to as "coating type Japanese paper tape base material"). In addition, there are known ones in which a synthetic resin is impregnated in a base paper in which a wood pulp is mixed with synthetic fibers and dried, and a synthetic resin is coated as a sealing layer of a release agent and a paint permeation-preventing layer on one surface of the impregnated paper (such a support will be hereinafter referred to as "impregnation-coating type Japanese paper tape base material").

The coating type Japanese paper tape base material is restricted on an adhesive in view of a problem of strike through of the liquid in an adhesive coating step because the synthetic resin does not sufficiently exist in the thickness direction of the base paper. In addition, the coating type Japanese paper tape base material is inferior in flexibility as a masking tape to the impregnation-coating type Japanese paper tape base material, and there is involved such a problem that it is hardly stuck onto a curved adherend. The impregnation-coating type Japanese paper tape base material is less restricted on an adhesive, and an aqueous acrylic adhesive excellent in releasability that is important for masking tapes and taking into consideration the environment can be used. Therefore, at present, the support of a Japanese paper tape for masking use moves to the impregnation-coating type Japanese paper tape base material.

The Japanese paper means a thin, high-strength planar paper which is obtained by paper-making by machine. Different from traditional Japanese papers, chemically cooked pulps such as wood kraft pulps are mainly used as a material of Japanese paper used for the tape base material. However, fibers of paper mulberry (*Broussonetia kazinoki* x *B. papyrifera*), Oriental paper bush (*Edgeworthia chrysantha*), Manila hemp, or the like may also be used. In addition, in order to improve the strength, it is also possible mix synthetic fibers such as polyester fibers, vinylon fibers, etc. Though there is no distinct definition for the machine-made Japanese paper, the thickness is approximately not more than 100 μm, the basis weight is approximately not more than 60 g/m$^2$, and the density is approximately not more than 0.7 g/cm$^3$.

As for the impregnation-coating type Japanese paper masking tape, so far as a crepe paper masking tape is concerned, not only the base material is thick so that the painting becomes thick, but the painting edges are blurred due to unevenness of the crepe, and therefore, beautiful finishing is not achieved. On the other hand, a masking tape using a Japanese paper as a base material is thin and smooth as compared with the crepe paper, and therefore, a parting line of the painting can be beautifully finished. Since the impregnation-coating type Japanese paper masking tape is easily torn off by hand (has hand-tearing properties), a blade is not required at the time of cutting, and its workability is good. In addition, while the impregnation-coating type Japanese paper masking tape has hand-tearing properties, it has sufficiently strength, and its workability is good. However, so far as the easiness of stretching is concerned, since wrinkles are present on the base material, the masking tape using a Japanese paper as a base material is inferior to the easily stretchable crepe paper masking tape.

In the masking tape, if the base material is hardly stretchable, the conformability becomes deteriorated, and at the time of sticking onto an uneven surface or curved surface, lifting or peeling from an adherend is easy to occur, and hence, the workability becomes deteriorated. Examples of a countermeasure for improving the conformability include the use of a base material which is stretchable at a low tension. In a base material in which even if a breaking elongation thereof is large, a large force is required for stretching, the conformability does not become good.

Examples of a method of obtaining a base material which is easily stretchable at a low tension include mixing of synthetic fibers which are easily stretchable at a low tension in the Japanese paper. However, in order to make the base material sufficiently easily stretchable, if the mixing amount of the synthetic fibers is increased, not only tangling among the synthetic fibers is easy to occur in the paper-making of Japanese paper, but the costs increase. Thus, the amount of the synthetic fibers is limited. Furthermore, if the mixing ratio of the synthetic fibers is increased, the stiffness of the base material becomes strong due to the synthetic fibers which are more rigid than natural pulps, and sticking onto the uneven surface becomes difficult. In addition to that, there is a concern that the tear strength becomes too high, so that the hand-tearing properties become deteriorated.

In the masking tape, if the strength of the base material, particularly the tear strength is low, the tape is torn at the time of peeling, thereby resulting in causing a reduction of the work efficiency.

As a countermeasure therefor, synthetic fibers of vinylon, PET, etc. having a fiber length of 3 mm or more are mixed in the Japanese paper tape base material, thereby increasing the tear strength. However, such synthetic fibers are expensive as compared with natural fibers. In order to increase the strength of the base material, there are a method of using synthetic fibers having a longer fiber length and a method of increasing the amount of synthetic fibers. However, if the fiber length is made long, tangling is easy to occur, and hence, there is a limit in the manufacture. If the amount of the synthetic fibers is increased, not only tangling is easily generated in the paper-making of Japanese paper, but the costs increase. Thus, the amount of the synthetic fibers is limited, too.

Japanese Patent No. 4456662 proposes an easily stretchable tape base material with high conformability by mixing a natural pulp with specified polyvinyl alcohol (vinylon) fibers having a low modulus and a large breaking elongation, in which only the fiber surface is dissolved by a wet heat treatment. Japanese Patent No. 4456662 describes that a mercerized pulp may be used for the natural pulp. However, this patent document does not give any specific description regarding its blending amount or effects and does not mention that the tear strength or conformability is enhanced by the mercerized pulp. In addition, if a large amount of synthetic fibers which are dissolved even partially is added, staining of a dryer is caused in a paper-making step, resulting in causing a problem from the standpoint of production.

JP-A-2010-203006 proposes to impregnate a specified resin in a base paper in which a natural pulp is mixed with synthetic fibers having a fineness of from 1 to 5 dtex, thereby improving the tear strength of a base material. However, JP-A-2010-203006 does not mention the conformability. In general, if the fiber diameter of synthetic fibers is large, the rigidity of the fibers becomes high. If a mixing ratio of such synthetic fibers is increased, the stiffness of the base material becomes strong, and the adhesion to the uneven surface becomes inferior. In addition, fibers having high rigidity involve such a defect that tangling is easy to occur in a paper-making step.

Japanese Patent No. 3691622 is concerned with a double-sided tape base material having a mercerized pulp mixed therein. The double-sided tape base material is used upon permeation of an adhesive, whereas the impregnation-coating type tape base material according to the present invention is one prepared by impregnating and coating a resin and then coating an adhesive on one surface, and therefore, the both are different in the configuration and use from each other. Japanese Patent No. 3691622 insists that by using the mercerized pulp, the strength of the double-sided tape base material and the permeability of the adhesive can be maintained while suppressing the use amount of rayon. However, Japanese Patent No. 3691622 does not describe the elongation of the base material.

JP-A-2007-31552 proposes that in order to prevent the occurrence of tape tearing at the time of peeling, a film base material having high tear strength is used for a masking tape. It is difficult to cut this film base material by hand, and a blade is required to be used for cutting, and hence, the workability is inferior.

Japanese Patent No. 4808987 proposes to prepare a fiber product of a Japanese paper tone having excellent tear strength by laminating a nonwoven fabric on a base cloth composed of thermoplastic polymer fibers having a fineness of from 5 to 60 dtex. In Japanese Patent No. 4808987, it is pointed out that in order to obtain the high tear strength, the fineness is required to be 5 dtex or more. Furthermore, similarly, in JP-A-6-200462, it is also pointed out that in order to keep the strength, a fineness of a certain value or more is required. Though a product using a nonwoven fabric is excellent in the strength, not only it is inferior in the hand-tearing properties to a paper base material, but the costs become high.

SUMMARY OF INVENTION

Problem that Invention is to Solve

A problem of the present invention is to provide an impregnation-coating type Japanese paper masking tape base material in which even when synthetic fibers are not used, the conformability is improved by making the masking tape easily stretchable, and the occurrence of tape tearing can be prevented due to sufficient tear strength.

Means for Solving Problem

In order to solve the foregoing problem, the present inventors made extensive and intensive investigations. As a result, it has been found that the problem is solved by using a mercerized pulp for a machine-made Japanese paper, leading to accomplishment of the present invention.

Specifically, the present invention provides the following.

(1) A method for manufacturing an impregnation-coating type Japanese paper masking tape base material, comprising:

using a machine-made Japanese paper in which a kraft pulp is blended in from 10 to 70% by weight of a mercerized softwood pulp.

(2) The method for manufacturing an impregnation-coating type Japanese paper masking tape base material as described in (1), wherein a resin having a glass transition temperature (Tg) of from 0 to 40° C. is coated in a dry coating amount of from 2 to 20 g/m$^2$ on one surface of an impregnated machine-made Japanese paper, which is impregnated with a resin having a glass transition temperature of not higher than −25° C. in an amount of 20% by weight or more relative to a weight of the machine-made Japanese paper having a basis weight of from 25 to 40 g/m$^2$.

(3) The method for manufacturing an impregnation-coating type Japanese paper masking tape base material as described in (2), wherein a weight weighted mean fiber length of the mercerized softwood pulp is 1.5 mm or more.

(4) The method for manufacturing an impregnation-coating type Japanese paper masking tape base material as described in any one of (1), (2) or (3), wherein the machine-made Japanese paper is blended with not more than 10% by weight of a synthetic fiber having a cut length of from 3.0 to 6.0 mm.

Effects of Invention

According to the present invention, an impregnation-coating type Japanese paper tape base material in which the conformability is improved by making the masking tape easily stretchable, and the work efficiency can be enhanced by improving the tear strength to hardly cause tape tearing can be obtained. Even when synthetic fibers which are easily stretchable but easily generate tangling as in the prior art are not used, the conformability of the base material can be enhanced, and furthermore, sufficient tear strength of the masking tape can be obtained. So far as synthetic fibers are not used, the tangling by synthetic fibers can be avoided, and a uniform Japanese paper can be obtained. Though it is desirable that synthetic fibers are not blended in the Japanese paper, for the purpose of obtaining higher tear strength, synthetic fibers may be blended so far as the amount thereof is small.

DETAILED DESCRIPTION OF THE INVENTION

Mode for Carrying Out Invention

Examples of the base paper which is used in the present invention include a Japanese paper prepared by mixing a kraft pulp and a softwood pulp having been subjected to a mercerization treatment, followed by paper-making. Though the paper-making is generally carried out using a cylinder paper machine, it may also be carried out using a Fourdrinier paper machine, an inclined wire paper machine, a tanmo paper machine, a combination type of a cylinder paper machine and a tanmo paper machine, or the like. As the kraft pulp, a softwood pulp is more desirable than a hardwood pulp in view of the strength. When the mercerized pulp is mixed, its weight percent in the mixture of the mercerized softwood pulp and the kraft pulp is 10% by weight or more and not more than 70% by weight, and preferably 20% by weight or more and not more than 50% by weight. In the case where the weight percent of the mercerized pulp is less than 10% by weight, not only sufficient conformability is not obtained, but the effect for enhancing the tear strength is small. In the case where the weight percent of the mercerized pulp is more than 70% weight, though the tear strength becomes high, the tensile strength is lowered, and hence, the tape tearing is easy to occur due to the breakage of the base material at the time of peeling. In addition to that, since the tape becomes excessively easily stretchable at a low tension, it becomes difficult to linearly stick the tape, and the workability is lowered. In addition, the density of the base paper is lowered, and a wet tension is lowered, and therefore, the impregnation work of an aqueous emulsion on a real machine becomes difficult. A weight weighted mean fiber length of the mercerized pulp is desirably 1.5 mm or more, and more preferably 2.0 mm or more. When the weight weighted mean fiber length of the mercerized pulp is less than 1.5 mm, the effect for enhancing the tear strength is small. Even when a hardwood pulp is used as the mercerized pulp, though the effect for enhancing the tear strength or the like is brought, the effect is smaller than that of a mercerized softwood pulp.

The mercerization of pulp can be carried out by an already-known method. The mercerized pulp can be obtained by dipping a chemical pulp such as a kraft pulp, a sulfite pulp, etc. in a strong alkali aqueous solution and then removing the residual alkali. In addition, the cooking method is not particularly limited, too. As the alkali aqueous solution, though hydroxides or carbonates of an alkali metal or an alkaline earth metal such as sodium, potassium, calcium, etc., and the like can be used, strong alkalis are preferable. In the case of the strong alkali aqueous solution, the dipping may be carried out by a treatment at room temperature for from about 10 minutes to 24 hours. The concentration of the strong alkali aqueous solution is generally 9% by weight or more and not more than 50% by weight. Since a large amount of the alkali component remains by the mercerization treatment, after the alkali treatment, it is preferable to remove the alkali component by means of washing with water or an acid aqueous solution. As the acid aqueous solution, an aqueous solution of a mineral acid such as dilute sulfuric acid, dilute hydrochloric acid, or phosphoric acid, or an acidic salt thereof, for example, ammonium sulfate, magnesium chloride, zinc nitrate, etc., can be used.

In addition, as a commercially available product, a trade name: POROSANIER-J-HP™ (company name: Rayonier Inc.) is known. This is a product prepared by pulping a softwood by the kraft process and then subjecting the pulp to a mercerization treatment with caustic soda. It is known that the single fiber strength increases by the mercerization treatment, and therefore, the pulp becomes rigid. In addition, the pulp fiber cross section becomes close to a true circle by wetting. Since the hydrogen bond between the fibers is hardly formed, the paper using a mercerized pulp becomes a bulky, low-density paper.

According to the present invention, the required conformability and tear strength can be obtained by using a mercerized pulp. In the case where a more tear strength is required, synthetic fibers may be mixed so far as the amount thereof is small. As the synthetic fibers, vinylon, polyesters, nylons, polyolefins, and acrylic resins can be used. Above all, vinylon and polyesters are preferable especially in view of maceration properties of the synthetic fibers. In view of the tear strength, fibers composed mainly of ones which are not fused are more preferable than heat-fusible type (binder) fibers. A weight percent of the synthetic fibers in the Japanese paper is 3% by weight or more and up to about 10% by weight. In the case where the weight percent of the synthetic fibers is less than 3% by weight, the effect to be brought by mixing the synthetic fibers is low, whereas when the weight percent of the synthetic fibers is high, tangling is easy to occur.

A fiber length (cut length) of the synthetic fibers is preferably 3.0 mm or more and not more than 6.0 mm. When the fiber length of the synthetic fibers is less than 3.0 mm, the effect for enhancing the strength of the base material is not sufficiently obtained. When the fiber length of the synthetic fibers exceeds 6.0 mm, the fibers are easily entangled, and tangling is easy to occur, and therefore, it becomes difficult to make a Japanese paper.

The Japanese paper as referred to in the present invention is not a crepe paper but a thin, high-strength planar paper which is obtained by paper-making by machine.

A basis weight of the Japanese paper is preferably 25 $g/m^2$ or more and not more than 40 $g/m^2$. When the basis weight of the Japanese paper is less than 25 $g/m^2$, when formed in a support, the sufficient strength is not obtained, and the tape is easily torn. In addition, when the basis weight of the Japanese paper is more than 40 $g/m^2$, the stiffness becomes strong, so that the adhesion to an adherend and the conformability becomes deteriorated. Incidentally, in order to impart the strength, a wet paper strength agent, a dry paper strength agent, and a paper strength aid can be added by means of internal addition or external addition.

The impregnated paper which is used in the present invention is one obtained by impregnating the Japanese paper with an emulsion based resin and drying it. Examples of the resin which is used include acrylic acid ester based, styrene-butadiene rubber based, and methyl methacrylate-butadiene rubber based emulsions, and the like, and these materials can be used either alone or in admixture. Above all, for the purpose of allowing the impregnated paper to have strength and flexibility, an emulsion resin having a glass transition temperature of not higher than −25° C. is preferable. When the glass transition temperature is higher than −25° C., the sufficient tear strength of the base material is not obtained, resulting in causing tape tearing.

An impregnation amount of the resin is preferably 20% by weight or more relative to the Japanese paper. When the amount of the resin is less than 20% by weight, the strength as a support is insufficient, and there is a concern of strike through of the liquid in an adhesive coating step, or the like.

As for the impregnation method, any of a method in which after paper-making, on-line impregnation is carried out by size press or the like, or a method in which after once paper-making, drying and winding up, off-line dip impregnation is carried out may be adopted.

Incidentally, the glass transition temperature of the resin as described in the present invention is one obtained by calculating from a resin monomer composition ratio and a glass transition temperature of each monomer.

The tape base material according to the present invention is provided with a resin layer for the purposes of preventing the occurrence of blocking, preventing the occurrence of penetration of a solvent, and the like. The resin which is provided on one surface of the impregnated paper is an emulsion based resin having a glass transition temperature of 0° C. or higher and not higher than 40° C. When the glass transition temperature of the resin is lower than 0° C., the deterioration of hand-tearing properties under high-temperature and high-humidity conditions is not improved, and there is a concern of the occurrence of blocking at the time of winding up the tape base material in a roll state. When a resin having a glass transition temperature of higher than 40° C. is used, the resin coating film properties are poor, and the effect for sealing a release agent and the effect for preventing paint permeation cannot be sufficiently obtained.

Examples of the resin include acrylic acid ester based, styrene-butadiene rubber based, acrylonitrile-butadiene rubber based, methyl methacrylate-butadiene rubber based, and vinyl acetate based emulsions, and the like, and these materials can be used either alone or in admixture.

A coating amount (dry basis weight) of the resin is preferably 2 g/m$^2$ or more and not more than 20 g/m$^2$. When the coating amount of the resin is less than 2 g/m$^2$, the occurrence of penetration of the solvent cannot be sufficiently prevented, and hence, such is not preferable. In addition, when the coating amount of the resin is more than 20 g/m$^2$, the costs increase.

For coating the resin, it is possible to adopt any of on-machine coating provided in a paper machine, or off machine coating after paper-making. A coating system is not particularly limited, and for example, coaters such as an air knife coater, a rod coater, a blade coater, etc. and other coating systems can be utilized.

A Japanese paper tape for masking use is obtained by using the impregnation-coating type Japanese paper masking tape base material according to the present invention as described above and coating a release gent and an adhesive by a known method. The masking tape is a releasable tape, and its adhesive force is generally low. In consequence, even when a release agent is not provided on the resin layer of the present invention, rewinding is relatively easy, and it is also possible to allow the resin layer to work as a release layer to omit it.

EXAMPLES

Examples of the present invention are hereunder described. A hand-made sheet was fabricated by a cylinder sheet machine. The measurement of physical properties was carried out in an atmosphere at 23° C. and 50% Rh.

A "breaking length" was determined by measuring a tensile strength according to the JIS P8113 method. In order to avoid errors in every experiment, a ratio when a value of Comparative Example 1 was made to be 1 was defined as a breaking length ratio. When the value is larger, the strength of the base material becomes larger. Incidentally, the breaking length as referred to herein means a length when a paper having been fixed at one end thereof and suspended was torn by its self-weight, the length being expressed in terms of km. The breaking length ratio is satisfactorily 0.50 or more, and preferably 0.60 or more from the standpoint of practical use.

The measurement of a "tear strength" was carried out according to the JIS P-8116 method. Similar to the breaking length, a ratio when a value of Comparative Example 1 was made to be 1 was defined as a tear strength ratio. When the value is larger, the tape tearing more hardly occurs. The tear strength ratio is satisfactorily 1.3 or more and not more than 5.0, and preferably 1.8 or more and not more than 3.0 from the standpoint of practical use. When the tear strength ratio exceeds 5.0, the hand-tearing properties become deteriorated As for a "load at the time of 6% elongation", a load at the time of 6% elongation was determined by the measurement of tensile strength as described above. Similar to the foregoing, a ratio when a value of Comparative Example 1 was made to be 1 was defined as a load ratio at the time of 6% elongation. When the value is smaller, the base material is more easily stretchable at a low tension, and the conformability becomes better. The load ratio at the time of 6% elongation is satisfactorily 0.3 or more and not more than 0.95, and preferably 0.60 or more and not more than 0.80. When the load ratio at the time of 6% elongation is more than 0.95, the conformability becomes deteriorated, whereas when it is lower than 0.30, it becomes difficult to linearly stick the tape.

Though actual products are manufactured by the above-described paper machines, the obtained tendency is not different from the comparison by a hand-made sheet.

(Mercerization)

In addition to a commercially available mercerized pulp, trade name: POROSANIER-J-HP™ (company name: Rayonier Inc.), a pulp obtained by independently subjecting a softwood kraft pulp to a mercerization treatment was prepared. To the pulp having been dehydrated after maceration (solid: 60 g), 200 mL of water was added, to which was then added caustic soda so as to have a concentration of 20% by weight, and the mixture was well stirred. After allowing the resulting mixture to stand for 30 minutes, water-squeezing was carried out, and the residue was washed with water and neutralized with dilute sulfuric acid. The resultant was further washed with water and dehydrated to obtain a mercerized pulp.

(Measurement of Fiber Length)

The measurement of fiber length of the mercerized pulp was carried out using a fiber length analyzer, Kajaani FS-200 (manufactured by Metso Automation). The fiber length of pulp was shown in terms of a weight weighted mean fiber length. As for synthetic fibers, a cut length was shown without measuring the fiber length.

Example 1

As a commercially available mercerized softwood pulp, POROSANIER-J-HP™ (company name: Rayonier Inc.) was prepared. 10% by weight of this mercerized pulp and 90% by weight of a commercially available softwood kraft pulp (referred to as "NBKP1", weight weighted mean fiber length: 2.8 mm) were mixed to fabricate a hand-made sheet of 35 g/m$^2$. This was impregnated with, as an impregnating agent, a mixed liquid of acrylic based emulsion (Tg=−54° C.)/SBR emulsion (Tg=−40° C.) (50/50 (dry weight ratio)) in an amount of from 25 to 30% by weight relative to the dry weight of the impregnated paper and then dried to obtain an impregnated tape base material. Incidentally, Tg of the impregnated liquid is defined as −47° C. from the ratio of the emulsions as mixed. An acrylic based emulsion (Tg=26° C.) was coated in a coating amount of 4 g/m$^2$ on this impregnated tape base material by using a wire bar, thereby obtaining an impregnation-coating type Japanese paper tape base material.

Example 2

An impregnation-coating type Japanese paper tape base material was obtained in the same manner as that in Example 1, except for changing the weight percent of the mercerized pulp (POROSANIER-J-HP™) in the mixture of the mercerized pulp and the kraft pulp to 20% by weight and the weight percent of NBKP1 to 80% by weight, respectively.

Example 3

An impregnation-coating type Japanese paper tape base material was obtained in the same manner as that in Example 1, except for changing the weight percent of the mercerized pulp (POROSANIER-J-HP™) to 50% by weight and the weight percent of NBKP1 to 50% by weight, respectively.

Example 4

An impregnation-coating type Japanese paper tape base material was obtained in the same manner as that in Example 1, except for changing the weight percent of the mercerized pulp (POROSANIER-J-HP™) to 65% by weight and the weight percent of NBKP1 to 35% by weight, respectively.

Example 5

A commercially available softwood kraft pulp, NBKP1 was mercerized by the above-described method. An impregnation-coating type Japanese paper tape base material was obtained in the same manner as that in Example 1, except that 30% by weight of NBKP1 was added to and mixed with 70% by weight of this mercerized pulp (referred to as "mercerized NBKP1") to fabricate a hand-made sheet of 35 $g/m^2$.

Example 6

The pulp used for the mercerization was changed to a different softwood kraft pulp from that of Example 5 (referred to as "NBKP2", weight weighted mean fiber length: 3.0 mm). 80% by weight of NBKP1 was added to and mixed with 20% by weight of NBKP2 having been subjected to a mercerization treatment (referred to as "mercerized NBKP2") to fabricate a hand-made sheet of 35 $g/m^2$. This was impregnated with, as an impregnating agent, an acrylic emulsion (Tg=−57° C.) in an amount of from 25 to 30% by weight relative to the dry weight of the impregnated paper and then dried to obtain an impregnated tape base material. This impregnated tape base material was coated in the same manner as that in Example 1, thereby obtaining an impregnation-coating type Japanese paper tape base material.

Example 7

An impregnation-coating type Japanese paper tape base material was obtained in the same manner as that in Example 1, except for mixing 10% by weight of vinylon fibers, VPB-102, manufactured by Kuraray Co., Ltd. (1.1 dtex, cut length: 5 mm, breaking elongation: 15%, dissolving temperature in water: 99° C.) as the synthetic fibers, 10% by weight of POROSANIER-J-HP™ as the mercerized pulp, and 80% by weight of NBKP1 to fabricate a hand-made sheet of 35 $g/m^2$.

Comparative Example 1

An impregnation-coating type Japanese paper tape base material was obtained in the same manner as that in Example 1, except for changing the weight percent of NBKP1 having not been subjected to a mercerization treatment to 100% by weight, thereby fabricating a hand-made sheet.

Comparative Example 2

An impregnation-coating type Japanese paper tape base material was obtained in the same manner as that in Example 1, except for changing the ratio of NBKP2 having not been subjected to a mercerization treatment to 100% by weight, thereby fabricating a hand-made sheet.

Comparative Example 3

An impregnation-coating type Japanese paper tape base material was obtained in the same manner as that in Example 1, except for changing the weight percent of the mercerized pulp (POROSANIER-J-HP™) to 5% by weight and the weight percent of NBKP1 to 95% by weight, respectively.

Comparative Example 4

A hand-made sheet was fabricated in the same manner as that in Example 1, except for changing the weight percent of the mercerized pulp (POROSANIER-J-HP™) to 20% by weight and the weight percent of NBKP1 to 80% by weight, respectively. This was impregnated with, as an impregnating agent, an acrylic emulsion (Tg=1° C.) in an amount of from 25 to 30% by weight relative to the dry weight of the impregnated paper and then dried to obtain an impregnated tape base material. This impregnated tape base material was coated in the same manner as that in Example 1, thereby obtaining an impregnation-coating type Japanese paper tape base material.

Comparative Example 5

An impregnation-coating type Japanese paper tape base material was obtained in the same manner as that in Example 1, except for changing the weight percent of the mercerized pulp (POROSANIER-J-HP™) to 80% by weight and the weight percent of NBKP1 to 20% by weight, respectively.

Comparative Example 6

An impregnation-coating type Japanese paper tape base material was obtained in the same manner as that in Example 1, except for changing the weight percent of the mercerized pulp (POROSANIER-J-HP™) to 100% by weight.

Comparative Example 7

An impregnation-coating type Japanese paper tape base material was obtained in the same manner as that in Example 1, except for mixing 5% by weight of vinylon fibers, VPB-102, manufactured by Kuraray Co., Ltd. as the synthetic fibers and 95% by weight of NBKP1 to fabricate a hand-made sheet of 35 $g/m^2$.

Comparative Example 8

An impregnation-coating type Japanese paper tape base material was obtained in the same manner as that in Example 1, except for mixing 10% by weight of vinylon fibers, VPB-102, manufactured by Kuraray Co., Ltd. as the synthetic fibers and 90% by weight of NBKP1 to fabricate a hand-made sheet of 35 $g/m^2$.

The physical properties of the impregnation-coating type Japanese paper tape base materials obtained in the Examples are shown in Table 1, and the physical properties of those obtained in the Comparative Examples are shown in Table 2.

The base materials in which a resin having a Tg of not higher than −25° C. was impregnated in a Japanese paper having 10% or more of a mercerized pulp mixed therein (Examples 1 to 6) have a tear strength ratio of 1.3 or more, and therefore, they hardly cause tape tearing in the peeling work in masking. Furthermore, they have a load ratio at the time of 6% elongation of not more than 0.90, are easily stretchable, and have conformability.

As shown in Example 7, when synthetic fibers such as vinylon, etc. are added to a mercerized pulp mixed paper, a higher tear strength can be obtained while suppressing a lowering of the breaking length.

When the Tg of the impregnating resin exceeds −25° C. as in Comparative Example 4, a sufficient tear strength is not obtained, and tape tearing is easy to occur.

When the weight percent of the mercerized pulp exceeds 70% by weight as in Comparative Examples 5 and 6, the breaking length ratio is less than 0.50 as compared with the single use of an untreated pulp, and therefore, tape tearing is easy to occur due to breakage at the time of peeling. Furthermore, the load at the time of 6% elongation is less than 0.30, and therefore, it becomes difficult to linearly stick the tape.

As shown in Comparative Examples 7 and 8, even when the synthetic fibers are mixed singly as in the conventional technologies, the tear strength and conformability are improved; however, when comparison is made in terms of the equal tear strength, the effect for improving the conformability relative to the mercerized pulp is not sufficient. Accordingly, when the weight percent is increased for the purpose of obtaining the conformability, the tear strength becomes excessively high, and therefore, there is a concern that the hand-tearing properties are deteriorated. In addition, tangling among fibers is easy to occur.

The evaluation results of the Examples are shown in Table 1.

TABLE 1

| | Mixed pulp and synthetic fibers | | | Tg of impregnating resin | Base paper Density | Impregnation-coating type Japanese paper masking tape base material | | |
|---|---|---|---|---|---|---|---|---|
| | Type | Mixing ratio % | Fiber length mm | ° C. | g/cm³ | Breaking length ratio | Tear strength ratio | Load ratio at the time of 6% elongation |
| | | | | | | Based on NBK1 singly | | |
| Example 1 | POROSANIER ™ | 10 | 3.0 | −47 | 0.49 | 0.80 | 1.4 | 0.81 |
| Example 2 | POROSANIER ™ | 20 | 3.0 | −47 | 0.50 | 0.78 | 1.8 | 0.80 |
| Example 3 | POROSANIER ™ | 50 | 3.0 | −47 | 0.44 | 0.64 | 2.4 | 0.66 |
| Example 4 | POROSANIER ™ | 65 | 3.0 | −47 | 0.44 | 0.52 | 4.1 | 0.53 |
| Example 5 | Mercerized NBKP1 | 70 | 2.1 | −47 | 0.50 | 0.61 | 2.3 | 0.57 |
| Example 6 | Mercerized NBKP2 | 20 | 2.6 | −57 | 0.54 | 0.60 | 2.1 | 0.60 |
| Example 7 | POROSANIER ™<br>Vinylon | 10<br>10 | 3.0<br>5.0 | −47 | 0.47 | 0.96 | 2.0 | 0.89 |

The evaluation results of the Comparative Examples are shown in Table 2.

TABLE 2

| | Mixed pulp and synthetic fibers | | | Tg of impregnating resin | Base paper Density | Impregnation-coating type Japanese paper masking tape base material | | |
|---|---|---|---|---|---|---|---|---|
| | Type | Mixing ratio % | Fiber length mm | ° C. | g/cm³ | Breaking length ratio | Tear strength ratio | Load ratio at the time of 6% elongation |
| | | | | | | Based on NBK1 singly | | |
| Comparative Example 1 | Untreated NBKP1 singly | 100 | 2.8 | −47 | 0.56 | 1.00 | 1.0 | 1.00 |
| Comparative Example 2 | Untreated NBKP1 singly | 100 | 3.0 | −47 | 0.48 | 0.76 | 1.1 | 0.76 |
| Comparative Example 3 | POROSANIER ™ | 5 | 3.0 | −47 | 0.53 | 1.13 | 1.1 | 1.15 |
| Comparative Example 4 | POROSANIER ™ | 20 | 3.0 | 1 | 0.50 | 0.91 | 1.2 | 0.85 |
| Comparative Example 5 | POROSANIER ™ | 80 | 3.0 | −47 | 0.40 | 0.27 | 5.6 | 0.27 |
| Comparative Example 6 | POROSANIER ™ | 100 | 3.0 | −47 | 0.35 | 0.20 | 3.3 | 0.17 |
| Comparative Example 7 | Vinylon | 5 | 5.0 | −47 | 0.51 | 0.98 | 1.3 | 0.95 |
| Comparative Example 8 | Vinylon | 10 | 5.0 | −47 | 0.48 | 0.93 | 1.8 | 0.92 |

INDUSTRIAL APPLICABILITY

According to the present invention, an impregnation-coating type Japanese paper masking tape base material in which the conformability is improved by making the masking tape easily stretchable, and the work efficiency is enhanced by improving the tear strength to hardly cause tape tearing can be obtained.

The invention claimed is:

1. A masking tape base material comprising:

a machine-made Japanese paper as a base paper, wherein the machine-made Japanese paper has a basis weight of from 25 to 40 $g/m^2$ and consists of a mercerized softwood pulp and a kraft pulp, a weight percent of the mercerized softwood pulp in a mixture of the mercerized softwood pulp and the kraft pulp being from 10 to 70% by weight, the machine-made Japanese paper is impregnated with a resin having a glass transition temperature of not higher than −25° C. in an amount of 20% by weight or more relative to a weight of the machine-made Japanese paper, and one surface of the impregnated machine-made Japanese paper is coated with another resin having a glass transition temperature (Tg) of from 0 to 40° C. in a dry coating amount of from 2 to 20 $g/m^2$.

2. The masking tape base material according to claim 1, wherein the weight percent of the mercerized softwood pulp is from 20 to 50% by weight.

* * * * *